US010430672B2

(12) United States Patent
Zhang et al.

(10) Patent No.: US 10,430,672 B2
(45) Date of Patent: Oct. 1, 2019

(54) HITCH ASSIST SYSTEM WITH TRAILER HEIGHT ESTIMATION AND HITCH COUPLER IDENTIFICATION

(71) Applicant: Ford Global Technologies, LLC, Dearborn, MI (US)

(72) Inventors: Yi Zhang, Sunnyvale, CA (US); Dongran Liu, San Jose, CA (US); Vidya Nariyambut murali, Sunnvyale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 15/902,051

(22) Filed: Feb. 22, 2018

(65) Prior Publication Data

US 2019/0258874 A1 Aug. 22, 2019

(51) Int. Cl.
| | |
|---|---|
| *G06K 9/00* | (2006.01) |
| *B60R 1/00* | (2006.01) |
| *G06T 7/246* | (2017.01) |
| *G06T 7/269* | (2017.01) |
| *G06K 9/62* | (2006.01) |
| *G06T 7/60* | (2017.01) |

(52) U.S. Cl.
CPC .......... *G06K 9/00791* (2013.01); *B60R 1/003* (2013.01); *G06K 9/6284* (2013.01); *G06T 7/246* (2017.01); *G06T 7/269* (2017.01); *G06T 7/60* (2013.01); *B60R 2300/808* (2013.01); *G06T 2207/20072* (2013.01); *G06T 2207/20104* (2013.01); *G06T 2207/30252* (2013.01)

(58) Field of Classification Search
CPC .. G06K 9/00791; G06K 9/6284; G06T 7/246; G06T 7/269; G06T 7/60; G06T 2207/20072; G06T 2207/20104; G06T 2207/30252; B60R 1/003; B60R 2300/808
See application file for complete search history.

(56) References Cited

U.S. PATENT DOCUMENTS

| | | | |
|---|---|---|---|
| 6,970,184 B2 | 11/2005 | Hirama et al. | |
| 2009/0010495 A1 | 1/2009 | Schamp et al. | |
| 2014/0012465 A1 | 1/2014 | Shank et al. | |
| 2016/0052548 A1 | 2/2016 | Singh et al. | |
| 2016/0288601 A1* | 10/2016 | Gehrke | B60D 1/36 |
| 2016/0288711 A1* | 10/2016 | Gehrke | G06T 7/73 |
| 2017/0174023 A1* | 6/2017 | Hu | B60D 1/36 |
| 2018/0215382 A1* | 8/2018 | Gupta | G08G 1/165 |

* cited by examiner

*Primary Examiner* — Brenda C Bernardi
(74) *Attorney, Agent, or Firm* — Raymond Coppiellie; Price Heneveld LLP

(57) ABSTRACT

A system and methods related to hitch assist are provided herein. An imager captures rear-vehicle images. A processor is configured to extract trailer and ground features from the captured images, compute vehicle motion displacement based on optical flow of the ground features, estimate a height of each trailer feature based on vehicle motion displacement and optical flow of the trailer features, and determine a trailer height based on the estimated heights of at least a portion of the trailer features.

20 Claims, 7 Drawing Sheets

HITCH ASSIST SYSTEM WITH TRAILER HEIGHT ESTIMATION AND HITCH COUPLER IDENTIFICATION

FIELD OF THE INVENTION

The present invention generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner. The present disclosure is intended to satisfy this need.

SUMMARY OF THE INVENTION

According to a first aspect of the present invention, a hitch assist system is provided and includes an imager for capturing rear-vehicle images. A processor is configured to extract trailer and ground features from the captured images, compute vehicle motion displacement based on optical flow of the ground features, estimate a height of each trailer feature based on vehicle motion displacement and optical flow of the trailer features, and determine a trailer height based on the estimated heights of at least a portion of the trailer features.

Embodiments of the first aspect can include any one or a combination of the following features:
 the trailer height corresponds to a height of a hitch coupler of a trailer, and the trailer features are extracted from a region of interest specified by a user;
 computation of vehicle motion displacement is further based on a known height of the imager;
 the processor is further configured to classify each trailer feature as on-trailer or off-trailer by thresholding the estimated height thereof;
 the processor determines the trailer height based on a median estimated height of only the trailer features classified as on-trailer;
 the processor determines the trailer height based on a median estimated height of all of the trailer features;
 the processor adds the trailer height to a global histogram;
 the processor is further configured to generate a top-down view from the captured images and apply a parametric circle function to locate circular structures to detect a hitch coupler of a trailer;
 the processor applies the parametric circle function to locate circular structures inside a region of interest specified by a user;
 the processor identifies a circular structure as representing the hitch coupler and applies a filter to the circular structure; and
 the processor centers the region of interest about a center coordinate of the circular structure in a subsequent image frame.

According to a second aspect of the present invention, a hitch assist system is provided and includes an imager for capturing rear-vehicle images. A processor is configured to extract ground features and potential trailer features from the captured images, compute vehicle motion displacement based on optical flow of the ground features, estimate a height of each potential trailer feature based on vehicle motion displacement and optical flow of the potential trailer features, classify the potential trailer features as on-trailer or off-trailer, and determine a trailer height based on the estimated heights of only the potential trailer features classified as on-trailer.

Embodiments of the second aspect can include any one or a combination of the following features:
 the trailer height corresponds to a height of a hitch coupler of a trailer, and the potential trailer features are extracted from a region of interest specified by a user;
 computation of vehicle motion displacement is further based on a known height of the imager;
 the processor adds the trailer height to a global histogram;
 the processor is further configured to generate a top-down view from the captured images and apply a parametric circle function to locate circular structures to detect a hitch coupler of a trailer;
 the processor applies the parametric circle function to locate circular structures inside a region of interest specified by a user;
 the processor identifies a circular structure as representing the hitch coupler and applies a filter to the circular structure; and
 the processor centers the region of interest about a center coordinate of the circular structure in a subsequent image frame.

According to a third aspect of the present invention, a method of estimating a trailer height is provided and includes the steps of capturing rear-vehicle images, extracting trailer and ground features from the captured images, computing vehicle motion displacement based on optical flow of the ground features, estimating a height of each trailer feature based on vehicle motion displacement and optical flow of the trailer features, and determining a trailer height based on the estimated heights of at least a portion of the trailer features.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
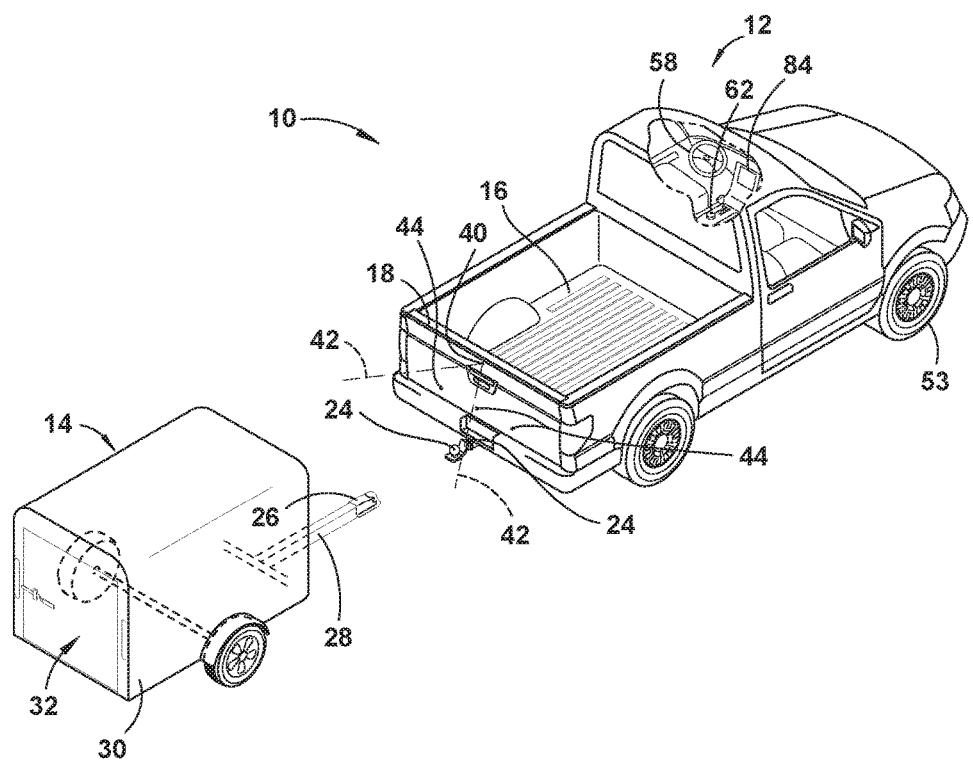
FIG. 1 is a top perspective view of a vehicle and a trailer, the vehicle being equipped with a hitch assist system according to one embodiment.
Figure 2:
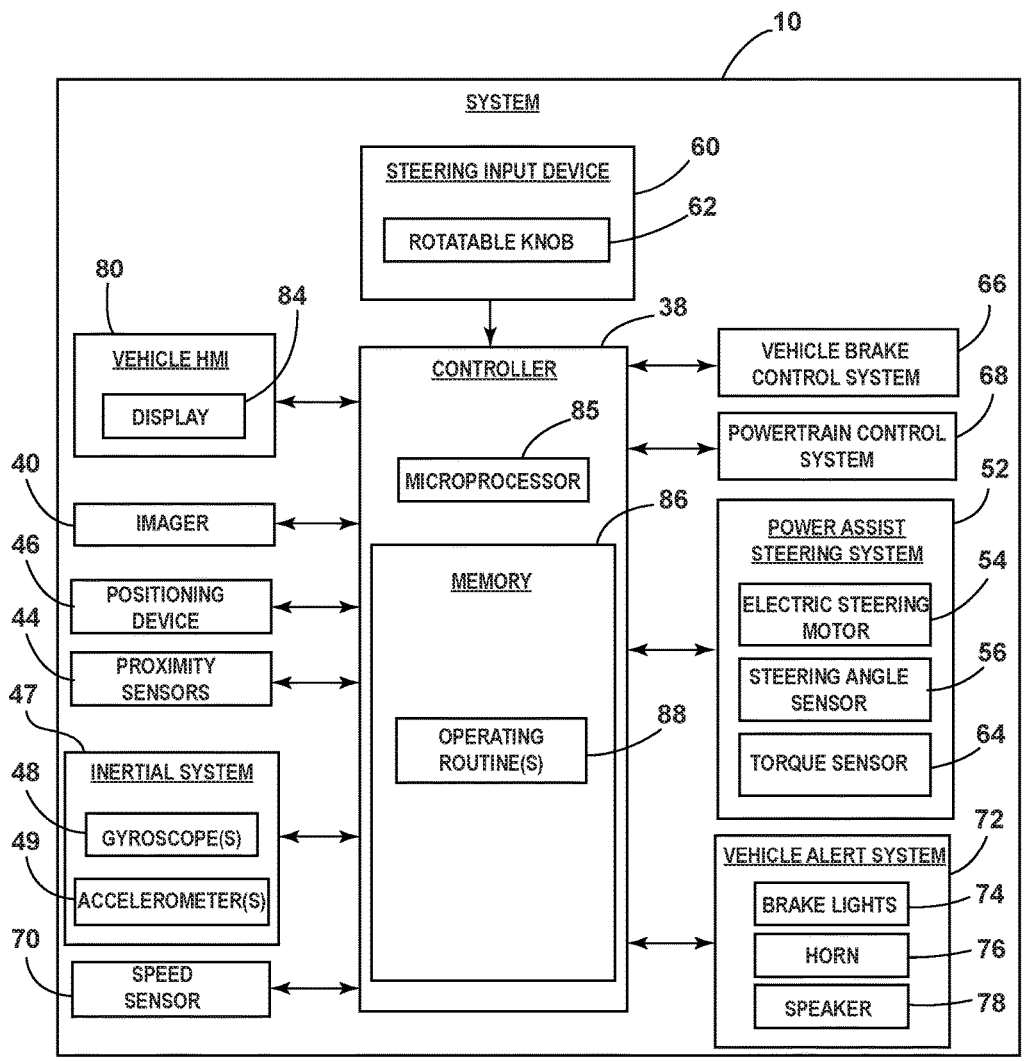
FIG. 2 is a block diagram illustrating certain components of the hitch assist system.

Referring to FIGS. 1 and 2, reference numeral 10 generally designates a hitch assist system for hitching a vehicle 12 to a trailer 14. As shown in FIG. 1, the vehicle 12 is exemplarily embodied as a pickup truck having a truck bed 16 that is accessible via a fold down tailgate 18. The vehicle 12 also includes a tow hitch in the form of a hitch ball 22 extending from a drawbar 24 that is coupled to the rear of the vehicle 12. The hitch ball 22 is configured to be received by a hitch coupler in the form of a coupler ball socket 26 that is provided at a terminal end of a trailer tongue 28. The trailer 14 is exemplarily embodied as a single axle trailer having a box frame 30 with an enclosed cargo area 32 from which the tongue 28 extends longitudinally.

The system 10 includes a controller 38 in communication with an imager 40 located at the rear of the vehicle 12. The imager 40 may be centrally located at an upper region of the tailgate 18 such that the imager 40 is elevated relative to the drawbar 24 and the hitch ball 22. The imager 40 has a field of view 42 located and oriented to capture one or more images of a rear-vehicle scene that generally includes the hitch ball 22, among other things. Images captured by the imager 40 may be processed the controller 38 to estimate a trailer height and identify a hitch coupler such as the coupler ball socket 26, for example.

In addition to communicating with the imager 40, the controller 38 may communicate with a number of proximity sensors 44 exemplarily shown as ultrasonic or radar sensors spaced across a lower region of the vehicle tailgate 18 and configured to detect the proximity or distance of objects located rearward of the vehicle 12. With reference to the embodiment of the system 10 shown in FIG. 2, additional vehicle-related information may be provided to the controller 38 by a positioning device 46, such as a global positioning system (GPS) located on the vehicle 12 and/or the trailer 14. Additionally, the controller 38 may communicate with an inertial system 47 including one or more gyroscopes 48 and accelerometers 49 to measure the position, orientation, direction, and/or speed of the vehicle 12.

To enable autonomous or semi-autonomous control of the vehicle 12, the controller 38 of system 10 may be further configured to communicate with a variety of vehicle equipment. According to one embodiment, the controller 38 of the system 10 may control a power assist steering system 52 of the vehicle 12 to operate the steered road wheels 53 of the vehicle 12 while the vehicle 12 is reversed toward the trailer 14 along a vehicle backup path. The power assist steering system 52 may be an electric power-assisted steering (EPAS) system that includes an electric steering motor 54 for turning the steered road wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provides an incremental change to the desired curvature of the backing path of the vehicle 12.

In some embodiments, the steering wheel 58 of the vehicle 12 may be mechanically coupled with the steered road wheels 53 of the vehicle 12, such that the steering wheel 58 moves in concert with steered road wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and therefore is indicative of manual intervention by the driver. In some embodiments, external torque applied to the steering wheel 58 may serve as a signal to the controller 38 that the driver has taken manual control and for the system 10 to discontinue autonomous steering functionality.

The controller 38 of the system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the system 10 to regulate the speed of the vehicle 12 during a backup maneuver of the vehicle 12. It should be appreciated that the controller 38 may additionally or alternatively regulate the speed of the vehicle 12 via interaction with the powertrain control system 68.

Through interaction with the power assist steering system 52, the vehicle brake control system 66, and/or the powertrain control system 68 of the vehicle 12, the potential for unacceptable backup conditions can be reduced when the vehicle 12 is backing toward the trailer 14. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 38 of the system 10 can generate an alert signal corresponding to a notification of an actual, impending, and/or anticipated unacceptable backup condition, and prior to driver intervention, generate a counter measure to prevent such an unacceptable backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen display 84 such as a center-stack mounted navigation or entertainment display capable of displaying images indicating the alert. Such an embodiment may be desirable to notify the driver of the vehicle 12 that an unacceptable backup condition is present. In alternative embodiments, the HMI 80 may include a portable device (e.g., a smartphone) capable of communicating with the controller 38 through a wireless interface.

The controller 38 is configured with a microprocessor 85 and/or other analog and/or digital circuitry for processing one or more logic routines stored in a memory 86. The logic routines may include one or more operating routines 88. Information from the imager 40 or other components of the system 10 can be supplied to the controller 38 via a communication network of the vehicle 12, which can include a controller area network (CAN), a local interconnect network (LIN), or other protocols used in the automotive industry. It should be appreciated that the controller 38 may be a stand-alone dedicated controller or may be a shared controller integrated with the imager 40 or other component of the system 10 in addition to any other conceivable onboard or off-board vehicle control systems.

Figure 3:
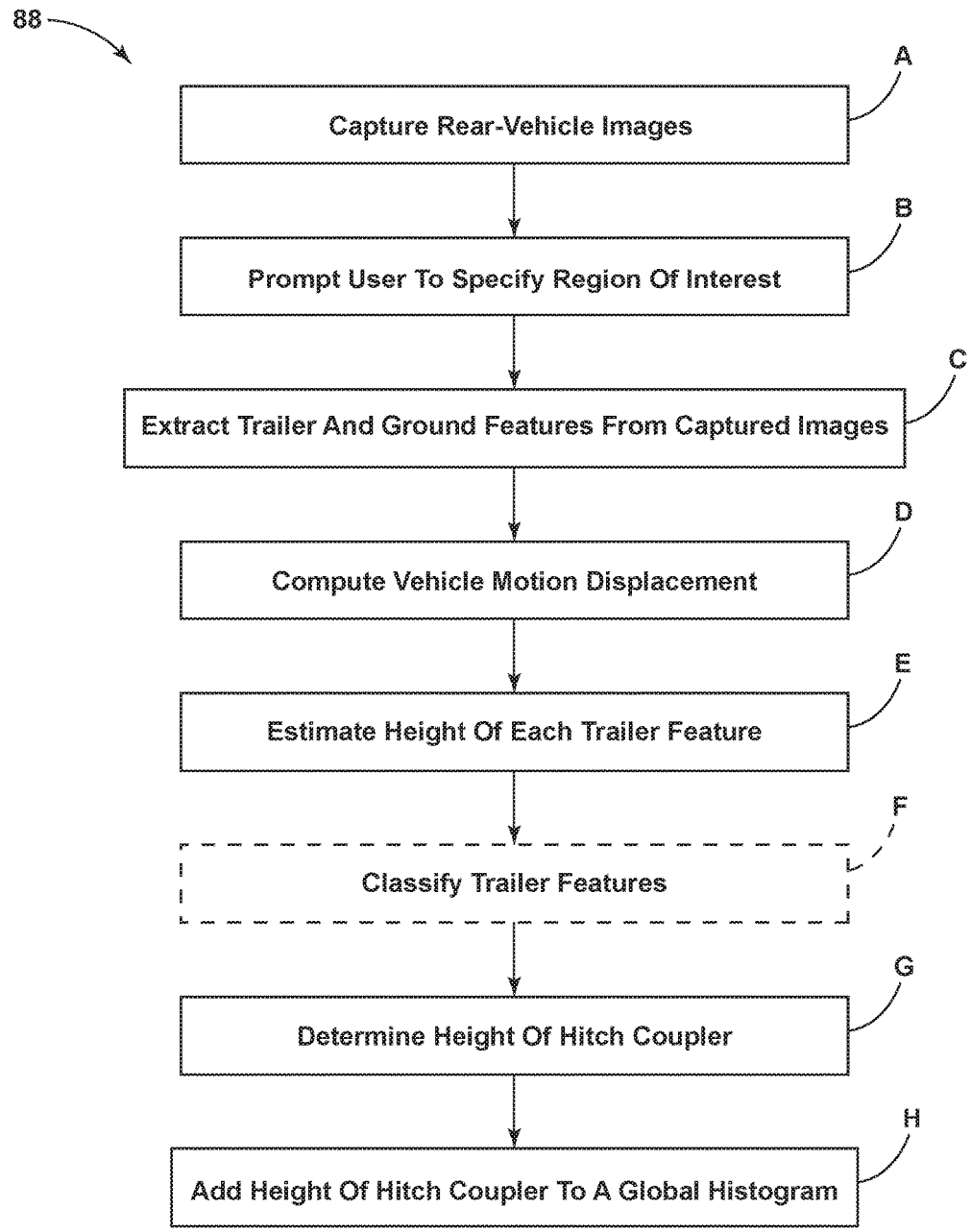
FIG. 3 is a flow chart of a method for estimating a trailer height.

Referring to FIG. 3, a method for estimating a trailer height is shown and is exemplarily embodied as one of the one or more operating routines 88. Accordingly, it will be understood that the method may be carried out by the system 10 described herein. In describing the method, it is assumed that the vehicle 12 is positioned close enough to the trailer 14 such that the trailer 14 can be imaged by the imager 40. The positioning of the vehicle 12 relative to the trailer 14 may be performed manually, semi-autonomously, or autonomously.

Figure 4:
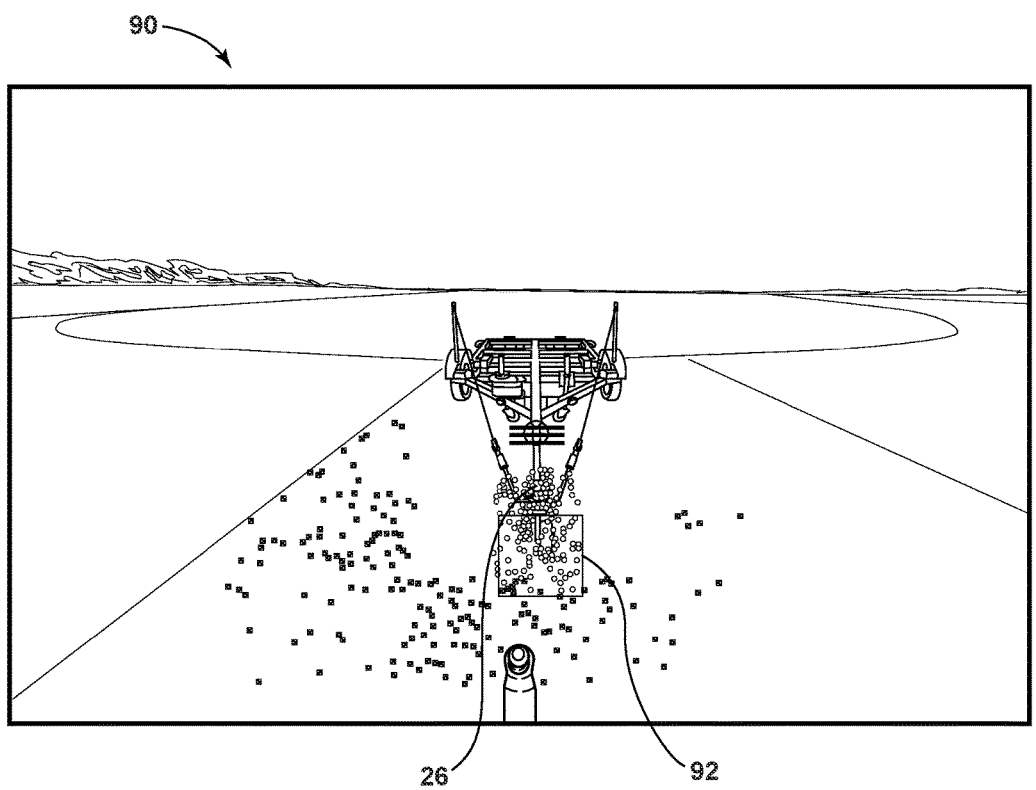
FIG. 4 represents a captured image in which ground and trailer are extracted by a processor from a sparse representation model.

At step A, the imager 40 is operated to capture rear-vehicle images. It is contemplated that the captured images may be displayed on the touchscreen display 84 and a user may be prompted by the system 10 to specify a region of interest (ROI) at step B. For example, a captured image 90 is shown in FIG. 4 and includes an ROI 92 specified by the user. The ROI 92 typically corresponds to a region of the captured image 90 in which a hitch coupler (e.g., coupler ball socket 26) is located. In specifying the ROI 92, the user may perform one or more touch events on the touchscreen display 84. In response, a processor (e.g., microprocessor 85) may generate a box or other indicator that provides visual feedback to the user. The one or more touch events may include a touch, a drag, and/or any other motion accomplished using one or more fingers on the touchscreen display 84.

At step C, the processor (e.g., microprocessor 85) analyzes the captured images and extracts trailer features and ground features therefrom. For example, as shown in the captured image 90 of FIG. 4, trailer features are generally represented by circles and ground features are generally represented by squares. The trailer and ground features may be extracted by the processor from a sparse representation model, although a dense representation model is also contemplated. In extracting the trailer and ground features, the processor may employ any suitable image processing technique such as, but not limited to, edge detection. In certain embodiments, the processor may perform additional processing on trailer features extracted at step C to distinguish between trailer features more likely to be located on the trailer 14 and those less likely to be located on the trailer 14. In doing so, the processor may focus on trailer features located inside the ROI 92 specified by the user. Thus, with respect to embodiments where the processor classifies trailer features as either on-trailer or off-trailer, it will be appreciated that the trailer features extracted from the captured image at step C generally serve as potential trailer features. By further scrutinizing these potential trailer features, an increase in trailer detection accuracy can be achieved.

Figure 5:
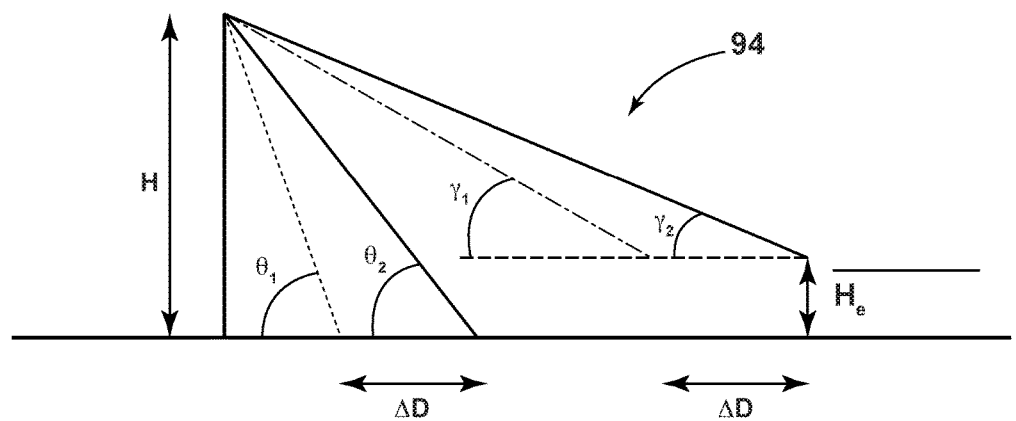
FIG. 5 illustrates a model used to compute vehicle motion displacement.

At step D, the processor computes a displacement of the vehicle 12, the displacement referred to herein as vehicle motion displacement. For example, computation of vehicle motion displacement may be based on a model 94 shown in FIG. 5. Referring thereto, the vehicle motion displacement $\Delta D$ is computed by solving the following equation:

$$\Delta D = \frac{H}{\tan \theta_2} - \frac{H}{\tan \theta_1}$$

where H is a known height of the imager 40, and $\theta_1$ and $\theta_2$ are derived from optical flow of the ground features.

At step E, the processor estimates a height of each trailer feature. For example, the height of each trailer feature may be estimated by solving the following equation:

$$\Delta D = \frac{H - H_e}{\tan \gamma_2} - \frac{H - H_e}{\tan \gamma_1}$$

where $H_e$ is the estimated height of a given trailer feature, $\Delta D$ is the vehicle motion displacement computed at step D, H is the known height of the imager 40, and $\gamma_1$ and $\gamma_2$ are derived from optical flow of the trailer features.

Optionally at step F, the processor can classify the trailer features by thresholding the estimated heights. That is, trailer features having estimated heights at or above a certain threshold may be classified as on-trailer whereas trailer features having estimated heights below the threshold may be classified as off-trailer.

At step G, the processor determines the height of the hitch coupler based on a median estimated height of the trailer features. In certain embodiments, the processor may determine the height of the hitch coupler based on the median estimated height of only the trailer features classified as on-trailer. The height of the hitch coupler determined at step G typically corresponds to the estimated height of the hitch coupler for a current image frame and can be added to a global histogram at step H. In so doing, the estimated height of the hitch coupler over multiple iterations of the present method will likely stabilize.

Figure 6:
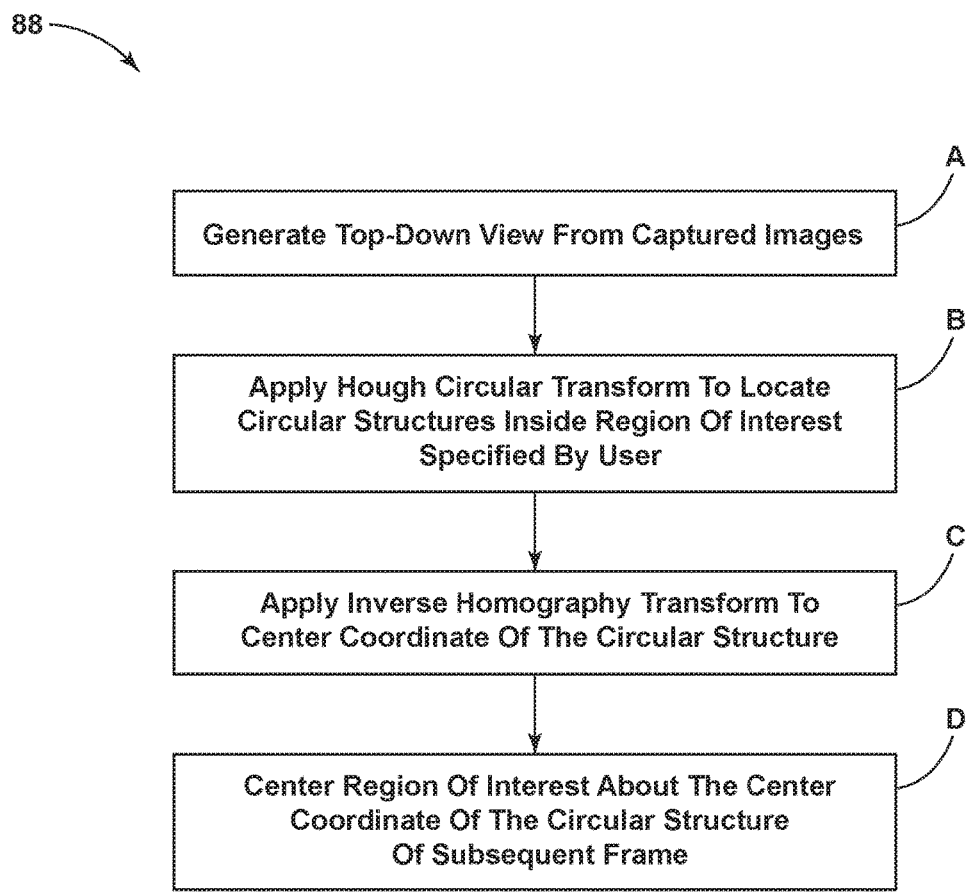
FIG. 6 is a flow chart of a method for identifying the hitch coupler.

Referring to FIG. 6, a method for identifying the hitch coupler (e.g., coupler ball socket 26) shown and is exemplarily embodied as one of the one or more operating routines 88. It will be understood that the method may be performed by the system 10 alongside the method described above for estimating the trailer height. Typically, the method is performed when the vehicle 12 is proximate the trailer 14 and is based on parameters associated with the imager 40. For example, such parameters may include resolution and/or lens characteristics. In a specific example, the method is performed when the vehicle 12 is approximately 2.5 meters from the trailer 14 and the imager 40 includes a 1280×800 pixel sensor and a lens having a 180 degree field of view.

Figure 7:
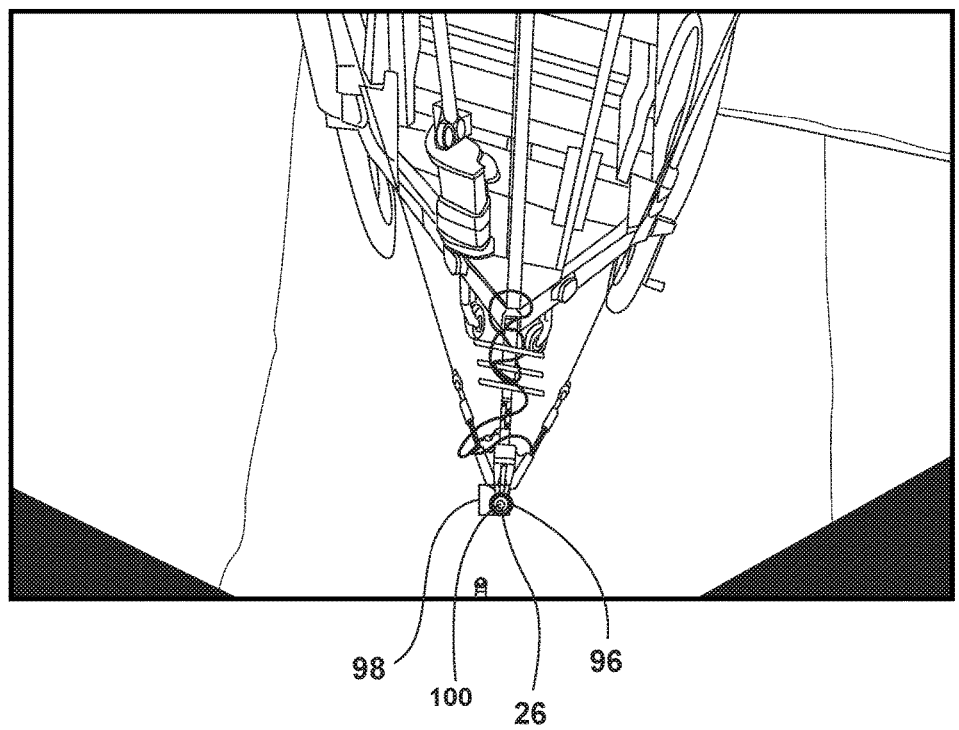
FIG. 7 represents a captured image in which a hitch coupler of a trailer is detected via Hough circle transform.

At step A, the processor applies image undistortion and homography transformation to generate a top-down view of images captured by the imager 40. At step B, the processor applies a Hough circular transform using a parametric circle function to locate circular structures inside an ROI specified by the user. In so doing, hitch couplers having circular shapes such as the coupler ball socket 26 may be more easily identified and distinguished from other structures of the trailer 14 appearing in the ROI. Such structures are typically associated with a tongue of the trailer 14 and oftentimes include straight edges easily differentiated from the general circular shape of the hitch coupler. As shown in FIG. 7, for example, a circular structure 96 detected via Hough circle transform is identified by the processor as representing the coupler ball socket 26. The circular structure 96 is generally located within an ROI 98 specified the user and may be one (e.g., ROI 92) specified previously by the user or one dedicated to the present method.

Upon identifying the circular structure, the processor applies a filter (e.g., a Kalman filter) to the circular structure in step B. At step C, the processor applies an inverse homography transform to a center coordinate (e.g., center coordinate 100 in FIG. 7) of the filtered circular structure. In so doing, the center coordinate can be tracked in subsequent images captured by the imager 40. At step D, the processor centers the ROI 98 about the center coordinate of the filtered circular structure for the next image frame. Through multiple iterations of the present method, the hitch coupler can be accurately tracked such that the tow hitch (e.g., hitch ball 22) of the vehicle 12 can be ultimately positioned below and aligned with the hitch coupler of the trailer 14.

Accordingly, a hitch assist system and a number of methods employed thereby have been advantageously described herein. The system facilitates the hitching of a vehicle to a trailer by leveraging image processing to estimate a trailer height and identify a hitch coupler of the trailer. In so doing, the system is able to determine if there is sufficient clearance between the hitch coupler and a tow hitch of a vehicle, and if so, guide the vehicle to a hitch position in which the hitch coupler and the tow hitch are aligned. Beneficially, the process of hitching a vehicle to a trailer is simplified and less daunting to those having little experience in the process.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch assist system comprising:
an imager for capturing rear-vehicle images; and
a processor configured to:
extract trailer and ground features from the captured images;
compute vehicle motion displacement based on optical flow of the ground features;
estimate a height of each trailer feature based on vehicle motion displacement and optical flow of the trailer features; and
determine a trailer height based on the estimated heights of at least a portion of the trailer features.

2. The system of claim 1, wherein the trailer height corresponds to a height of a hitch coupler of a trailer, and wherein the trailer features are extracted from a region of interest specified by a user.

3. The system of claim 1, wherein computation of vehicle motion displacement is further based on a known height of the imager.

4. The system of claim 1, wherein the processor is further configured to classify each trailer feature as on-trailer or off-trailer by thresholding the estimated height thereof.

5. The system of claim 4, wherein the processor determines the trailer height based on a median estimated height of only the trailer features classified as on-trailer.

6. The system of claim 1, wherein the processor determines the trailer height based on a median estimated height of all of the trailer features.

7. The system of claim 1, wherein the processor adds the trailer height to a global histogram.

8. The system of claim 1, wherein the processor is further configured to generate a top-down view from the captured images and apply a parametric circle function to locate circular structures to detect a hitch coupler of a trailer.

9. The system of claim 8, wherein the processor applies the parametric circle function to locate circular structures inside a region of interest specified by a user.

10. The system of claim 9, wherein the processor identifies a circular structure as representing the hitch coupler and applies a filter to the circular structure.

11. The system of claim 10, wherein the processor centers the region of interest about a center coordinate of the circular structure in a subsequent image frame.

12. A hitch assist system comprising:
an imager for capturing rear-vehicle images; and
a processor configured to:
extract ground features and potential trailer features from the captured images;
compute vehicle motion displacement based on optical flow of the ground features;
estimate a height of each potential trailer feature based on vehicle motion displacement and optical flow of the potential trailer features;
classify the potential trailer features as on-trailer or off-trailer; and
determine a trailer height based on the estimated heights of only the potential trailer features classified as on-trailer.

13. The system of claim 12, wherein the trailer height corresponds to a height of a hitch coupler of a trailer, and wherein the potential trailer features are extracted from a region of interest specified by a user.

14. The system of claim 12, wherein computation of vehicle motion displacement is further based on a known height of the imager.

15. The system of claim 12, wherein the processor adds the trailer height to a global histogram.

16. The system of claim 12, wherein the processor is further configured to generate a top-down view from the captured images and apply a parametric circle function to locate circular structures to detect a hitch coupler of a trailer.

17. The system of claim 16, wherein the processor applies the parametric circle function to locate circular structures inside a region of interest specified by a user.

18. The system of claim 17, wherein the processor identifies a circular structure as representing the hitch coupler and applies a filter to the circular structure.

19. The system of claim 18, wherein the processor centers the region of interest about a center coordinate of the circular structure in a subsequent image frame.

20. A method of estimating a trailer height, comprising the steps of:
capturing rear-vehicle images;

extracting trailer and ground features from the captured images;
computing vehicle motion displacement based on optical flow of the ground features;
estimating a height of each trailer feature based on vehicle motion displacement and optical flow of the trailer features; and
determining a trailer height based on the estimated heights of at least a portion of the trailer features.

* * * * *